Figure 1A:
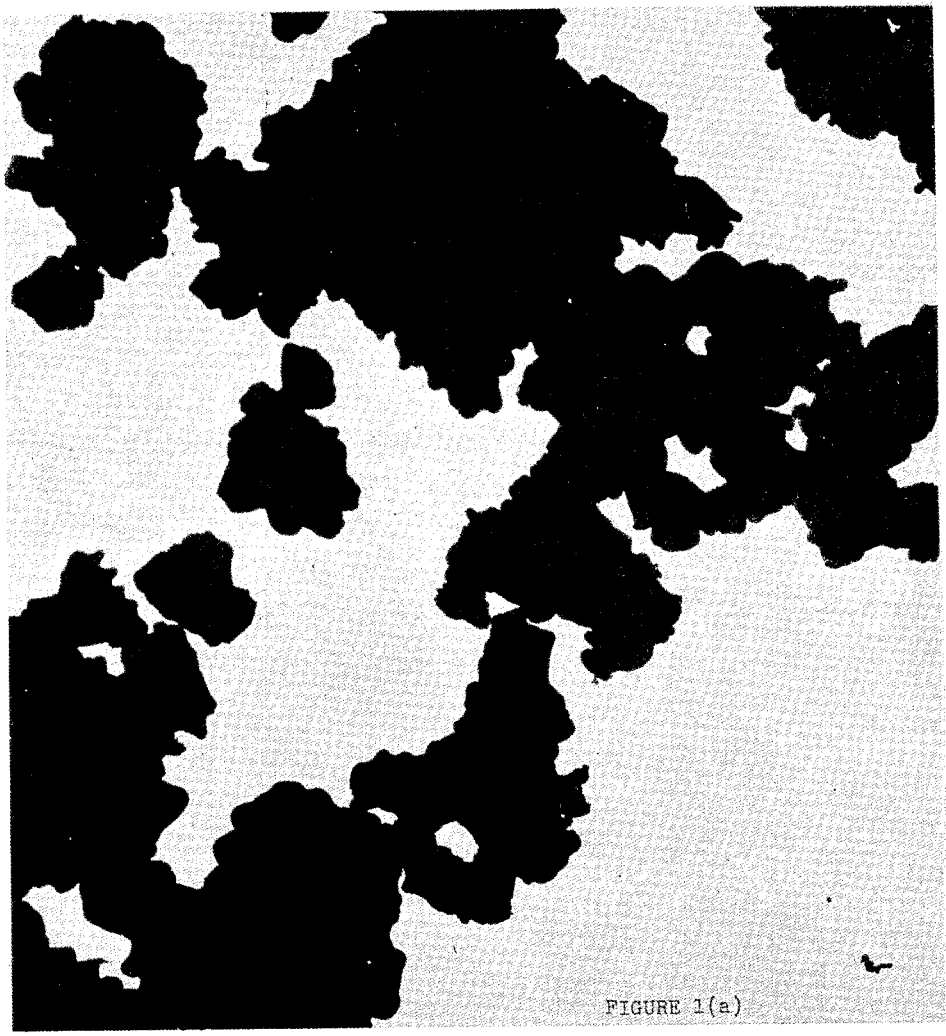

INVENTORS
Edward G Jefferson
Robert C. Smith, Jr.
Alvin B Stiles

ATTORNEY

United States Patent Office 2,776,315
Patented Jan. 1, 1957

2,776,315

PROMOTED COBALT OXIDE CATALYSTS FOR HEXAMETHYLENE DIAMINE PRODUCTION

Edward G. Jefferson, Robert C. Smith, Jr., and Alvin B. Stiles, Charleston, W. Va., assignors to E. I. du Pont de Nemours and Company, Wilmington, Del., a corporation of Delaware Application July 8, 1953, Serial No. 366,686

5 Claims. (Cl. 260—583)

This invention relates to improved cobalt oxide catalysts having a controlled quantity of one or more promoters to be described hereinafter.

In the hydrogenation of adiponitrile to hexamethylenediamine using a reduced sintered cobalt oxide catalyst (mole ratio of cobalt to oxygen prior to reduction 1.1:1 to 0.75:1) at 50° C. to 70° C. under superatmospheric pressure, it has been observed that quantities of undesirable by-products, including 1,2-diaminocyclohexane are produced. It has also been found that the amounts of these by-products vary with synthesis conditions, and that a more active catalyst permits operation under conditions which result in reduced by-product formation. For example, 1,2-diaminocyclohexane formation is minimized by using the lowest practicable reaction temperature.

We have discovered that silica in quantities which preferably do not exceed 1.0%, has a marked beneficial effect in increasing catalyst activity and hence in permitting operation under conditions minimizing by-product formation. Titania acts in a manner analogous to that of silica. Alumina increases the activity but causes new undesirable side reactions to occur during the hydrogenation of the adiponitrile. In the experiments described below a catalyst containing 0.10% silica is used as a standard, and its activity for purposes of comparison is defined as 100%.

*Example I.*—A solution of pure cobalt nitrate in water (2.35% cobalt) was prepared by digesting an excess of cobalt (commercial purity) in aqueous nitric acid of 60% concentration, and allowing the temperature to rise slowly to 90° C., until the pH increased from about 2 to exactly 5.4. At this pH the impurities in the cobalt nitrate solution precipitated as hydroxides or basic nitrates, and the cobalt remained in solution. (Note: It was found that if the pH of the solution in the digester increases above 5.4 the cobalt itself tends to precipitate as basic nitrate, and therefore the use of a pH above 5.4 was avoided). The temperature of the mixture was then lowered to 60° C., which insured complete precipitation of the impurities. The mixture was filtered, and the filtrate was diluted with distilled water until the concentration of dissolved cobalt was 23.5 grams per liter of solution. This mixture was heated to 80° C. and separate portions were agitated and admixed with the various promoters. One of the promoters employed was a silicic acid sol. This was made as follows: Technical grade sodium metasilicate crystals were dissolved in distilled water to produce a 20% (by weight) solution. This solution was measured into glass containers (stainless steel was also used in some instances) in quantity sufficient to provide 0.03, 0.1, 0.2, 0.5, and 1.0% silica, based on the weight of cobalt oxide, corresponding to the cobalt nitrate in the solutions described above. The metasilicate solution in each instance was diluted to 4%, and was acidified with vigorous agitation for about 60 seconds to a pH of 3 with concentrated nitric acid. Agitation was continued for about 10 seconds, and thereupon the resulting sol was added to the cobalt nitrate solution. Care was taken to introduce the sol before it gelled, which it had a tendency to do when the agitation was not sufficiently vigorous.

Another promoter employed was "Ludox" 30% suspension of colloidal silica in water, the method of addition being that used for the addition of the silicic acid sol just described. The suspension was acidified by adding 1.43 milliliters of 70% nitric acid for each gram of the 30% suspension. Still another variety of silica promoter, used with the portions of the cobalt nitrate solution, was derived from ethyl orthosilicate by hydrolysis. The resulting sol was used in the same manner as the sol described above. In each of these catalysts the colloidal silica had the same effect, regardless of the source thereof. In addition to the silica promoters introduced as above described, several samples of the cobalt nitrate solution were treated with amounts of a 20% titanium hydrate gel sufficient to furnish between 0.05 and 1% titanium oxide in the finished catalyst. Other samples of cobalt nitrate solution were treated with silica (in the same manner as above mentioned) and also with a series of copromoters which were used to improve the strength and directivity of the catalyst. All of the cobalt nitrate solutions, promoted and copromoted, were converted to the catalyst by using the same procedure. In each instance the agitated cobalt nitrate mixture was heated to 85°, and granulated ammonium carbonate was added at that temperature, until by testing it was found that a further addition of ammonium carbonate produced no additional precipitate. Starting with a batch of cobalt nitrate of sufficient quantity to yield 420 grams of cobalt oxide, the quantity of ammonium carbonate required was about 900 grams. The resulting slurry of cobalt carbonate was digested for about two hours at 85° C. after which it was filtered on a Buchner funnel, of a size so chosen that the filter cake was about two inches thick. This cake was washed with one liter of distilled water for each 150 grams of cobalt, calculated as cobalt metal. Thereupon, the cake was pressed and dewatered until it was compacted to a one-inch thickness. The wet compressed cake was placed in stainless steel trays and ignited at 400° C. for 3 hours. After this it was densified by kneading in a sigma blade mixer with 40 grams of distilled water for each 100 grams of ignited catalyst. After drying at 150° C. for 16 hours the densified catalyst was granulated to 10 mesh, mixed with 3% "Sterotex" stearin lubricant (cf. U. S. 2,570,882) for ½ hour, then pelleted to ¼-inch cylinders in a tabletting machine. The pellets were placed in small (2-inch inside diameter) inconel crucibles with perforated bottoms wherein they were sintered for three hours in air at gradually increased temperature, ranging from 700 to 900° C. To reduce the catalyst thus obtained, the catalyst was heated to 350°-380° C., in a current of nitrogen, and thereafter at 400° in a current of gas consisting of two volumes of hydrogen per volume of nitrogen. As the reduction proceeded the hydrogen concentration was increased every ½ hour gradually until at the end of 2 hours the nitrogen was turned off and pure hydrogen was used. After about two additional hours the reduction was substantially complete and the 100% $H_2$ passing through the reducer contained no condensible moisture. The catalyst was cooled to 50°, flushed with nitrogen, and stored under adiponitrile covered with a nitrogen blanket.

The procedure described above is illustrative, and the invention is not limited thereto. For example, in the preparation of the catalyst, as set forth above, the conversion of the dried cobalt carbonate to oxide may be performed by heating in air at any temperature from 150° to 500° C. The range of temperature at which the catalyst, after reduction, is employed in the hydrogenation of adiponitrile, with the advantages herein described, is preferably 50° to 170° C. The reduction and hydrogenation conditions are disclosed in detail in U. S. Patent 2,166,152.

In comparing the specimens of catalyst prepared as above described, a stainless steel shaker tube autoclave (capacity, 325 cc.) was employed. The catalyst (20 grams) was placed in a basket on the autoclave head and the nitrile was placed in the tube. The head was placed on the tube and approximately 100 gm. anhydrous ammonia was added. Ammonia was bled off until exactly 75 grams remained. With the inlet valve closed the bomb was heated to 100° C., while being subjected to mechanical agitation. Hydrogen was admitted until the pressure reached 1400 p. s. i.; when the temperature of the bomb reached 120° C., the hydrogen pressure was increased to 4000 p. s. i. With the inlet closed, the temperature was raised to 150° and the hydrogenation was continued at that temperature. Hydrogen was injected to bring the pressure back to 4000 p. s. i., each time it fell to 3500 p. s. i. After 120 minutes of this treatment, the tube was chilled and the material in the tube was discharged and analyzed. The physical disintegration or breakage of the catalyst was measured empirically by weighing the quantity of used catalyst which passed through a 35-mesh sieve. A comparison of the activities of the catalysts was obtained from the rate of hydrogen uptake.

In addition to these tests in shaker tube equipment, the catalysts were separately tested in a semi-works plant, and the results paralleled those that would have been predicted from the shaker tube evaluations. The results obtained in the shaker tube experiments are reported in the following tables.

TABLE I

*Effect of controlled silica content of reduced cobalt oxide catalyst (cobalt catalyst prepared from cobalt nitrate ex cobalt from African Metals Corp.)*

| Percent Silica | Activity, Percent Standard |
|---|---|
| 0.04 | 65 |
| 0.10 | ¹ 100 |
| 0.20 | 145 |
| 0.50 | 220 |
| 1.0 | 350 |

¹ By definition.

TABLE II

*Effect of controlled titania content on reduced cobalt oxide catalyst (cobalt catalyst prepared from cobalt nitrate ex cobalt from African Metals Corp.)*

| Percent Titania | Activity, Percent Standard |
|---|---|
| 0.10 | 65 |
| | 140 |
| 0.18 | 165 |

It is to be noted that the cobalt nitrate employed in the tests reported in the foregoing tables had been substantially freed of impurities by the method hereinabove described. Without such purging of impurities, commercially available cobalt is of somewhat variable composition and the catalysts derived therefrom are of variable activity. This is shown in the following table.

TABLE III

*Average analysis of cobalt purchased, 1943–50*

| | Percent Co | Percent Ni | Percent CaO | Percent $SiO_2$ | Percent Fe | Percent Mn | Percent MgO |
|---|---|---|---|---|---|---|---|
| 1943 | 98.0 | 0.61 | 0.31 | 0.35 | 0.19 | 0.05 | 0.04 |
| 1944 | 98.2 | 0.53 | 0.23 | 0.25 | 0.18 | 0.06 | 0.08 |
| 1945 | 98.7 | 0.46 | 0.18 | 0.18 | 0.16 | 0.08 | 0.04 |
| 1946 | 98.4 | 0.36 | 0.16 | 0.34 | 0.16 | 0.11 | 0.03 |
| 1947 | 98.7 | 0.37 | 0.14 | 0.13 | 0.10 | 0.09 | None |
| 1948 (1st Half) | 98.2 | 0.49 | 0.22 | 0.29 | 0.20 | 0.05 | 0.12 |
| 1948 (2nd Half) | 99.0 | 0.42 | 0.08 | 0.15 | 0.10 | 0.03 | None |
| 1949 | 99.1 | 0.46 | 0.04 | 0.10 | 0.07 | 0.03 | None |
| 1950 (1st Half) | 99.2 | 0.36 | 0.04 | 0.03 | 0.07 | 0.03 | None |
| 1950 (2nd Half) | 98.5 | 0.50 | 0.11 | 0.23 | 0.17 | 0.07 | 0.14 |

The explanation for the effects of controlled amounts of silica and titania is not fully understood. However, it has been demonstrated that the surface area of the catalyst is enhanced by the presence of silica (Table IV) or titania (Table V).

TABLE IV

*Surface areas of silica promoted reduced cobalt oxide catalysts*

| Percent Silica | Surface Area ($M.^2Gm.^{-1}$) |
|---|---|
| 0.05 | 2.7 |
| 0.13 | 4.0 |
| 0.20 | 5.4 |
| 0.25 | 6.2 |
| 0.50 | 7.6 |

(N. B. Surface areas determined by the B. E. T. method using methane.)

TABLE V

*Surface areas of titania promoted reduced cobalt oxide catalysts*

| Percent Titania | Surface Area ($M.^2Gm.^{-1}$) |
|---|---|
| | 2.3 |
| 0.08 | 3.4 |
| 0.14 | 4.2 |

It is found that on heating cobalt oxides at the ignition and sintering temperatures, both silica and titania have a marked inhibitory effect on crystallite growth. (Tables VI and VII.)

TABLE VI

*Effect of silica on the crystallite size of cobalt oxides obtained by heating basic cobalt carbonate at different temperatures for 3 hours*

| Temperature, °C. | 0.04% Silica, Mean Crystallite Size (A.) | 0.14% Silica, Mean Crystallite Size (A.) |
|---|---|---|
| 200 | 200 | 180 |
| 300 | 205 | 210 |
| 350 | 255 | 220 |
| 400 | 380 | 300 |
| 500 | 1,100 | 515 |
| 600 | 5,000 | 2,000 |
| 700 | 15,000 | 2,500 |

(Crystallite sizes less than 1500 A. were calculated from the line broadening effect in the X-ray diffraction pattern—Debye Scherrer method. Other values were obtained by electron microscopy.)

TABLE VII

*Effect of titania on the crystallite size of cobalt oxides obtained by heating basic cobalt carbonate at different temperatures for 3 hours*

| Temperature, °C. | No Promoter, Mean Crystallite Size (A.) | 0.18% TiO₂ Mean Crystallite Size (A.) |
|---|---|---|
| 300 | 200 | 180 |
| 400 | 380 | 360 |
| 500 | 1,100 | 750 |
| 600 | 5,000 | 2,000 |

Figure 1B:
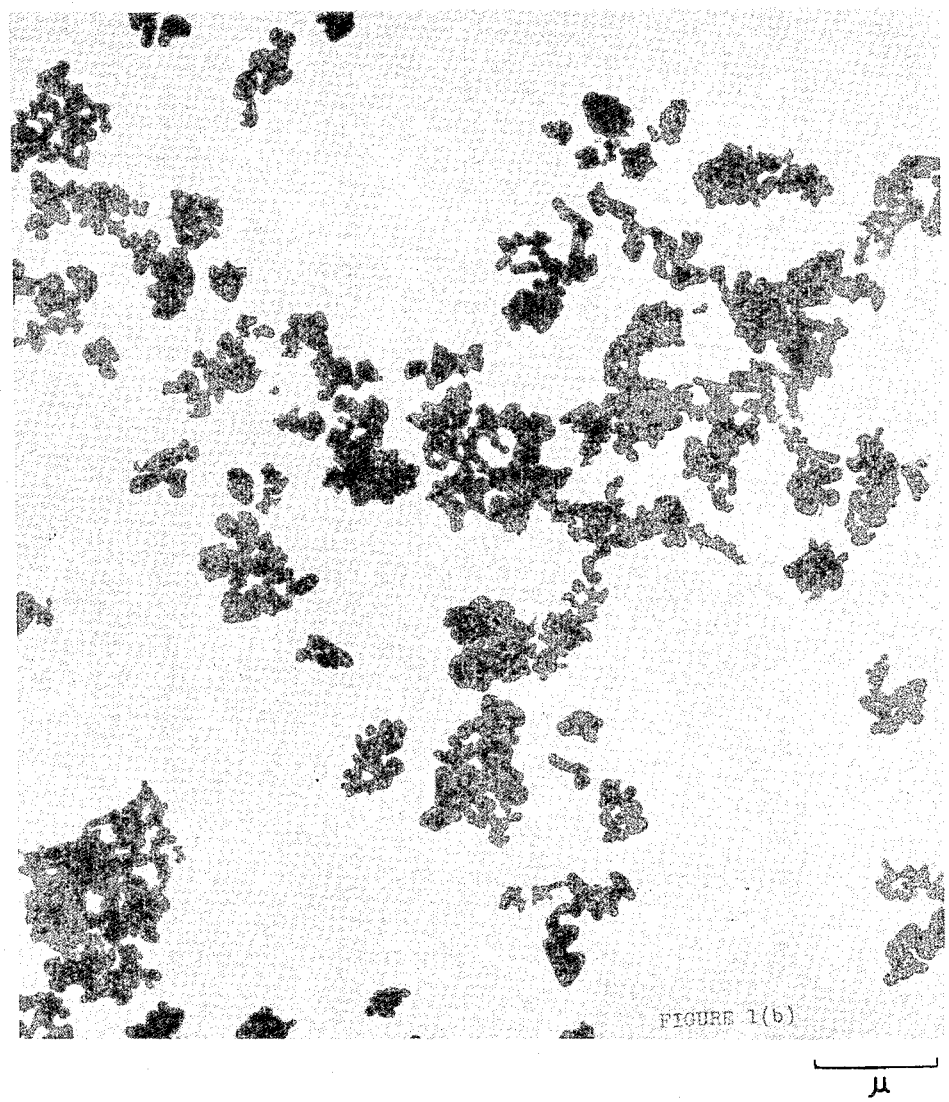
Figure 1C:
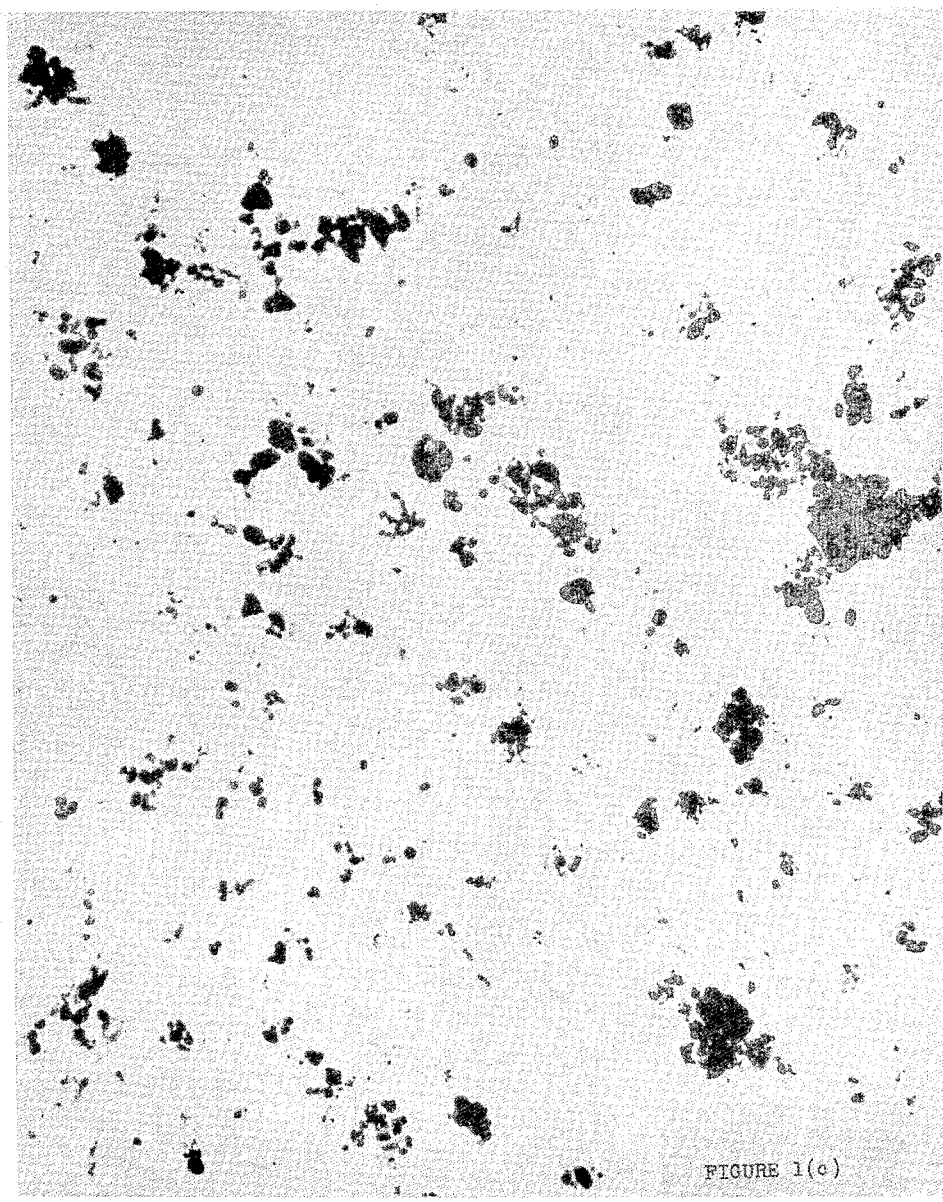

Three electron micrographs (Figure 1 (a) (b) (c)) illustrate the effects of silica and titania in inhibiting crystal growth of cobalt oxide ($Co_3O_4$) when heated for 3 hours at 600°. 1 (a) is cobalt oxide free of promoter; 1 (b) contains 0.2% silica and 1 (c) 0.2% titania.

It has also been shown that silica is effective in preventing loss of catalyst surface area during repeated regenerations.

It is to be understood that the cobalt metal employed in the preparation of the catalysts of this invention need not be virgin metal, but may be spent catalyst containing sulfur, etc. as impurities. However, when spent catalyst is employed the cobalt nitrate solution, prior to treatment with silica, should be admixed with a quantity of barium nitrate exactly equivalent to the sulfate content of the solution. In this way sulfate can be precipitated and removed by filtration or decantation. The sulfate-free solution can then be used in the manner already described. Since traces of barium may be introduced into the catalyst in this manner it is sometimes preferable to maintain the barium content of the catalyst at a fixed and predetermined level, to avoid variations in catalyst activity, and this can be done satisfactorily without deleterious effect when the silica promoter is present as above described. The quantity of barium which serves the desired purpose is about 0.02 to 0.10%. Alternatively, barium can be completely eliminated by very careful control over the pH during $BaSO_4$ precipitation, and in this way the need for deliberate introduction of a controlled amount of barium to produce constant activity can be obviated. However, as a practical matter, it is frequently preferable to hold the barium content at a controlled low level, i. e., ca. 0.05%. More than 0.1% barium weakens the catalyst somewhat (i. e., results in breakage).

While thoria and alumina have a promoting action somewhat similar to that of silica and titania, the quantities of promoter required are greater. This is important because relatively large amounts of such promoters (e. g., 1% alumina) appear to cause increased by-product formation.

The effect of synthesis temperature on the formation of 1,2-diaminocyclohexane is illustrated in Table VIII.

TABLE VIII

*1,2-diaminocyclohexane formation in the synthesis of hexamethylenediamine from adiponitrile over a reduced cobalt oxide catalyst—effect of temperature*

| T (° C.) | 1, 2-Diaminocyclohexane (p. p. m.) |
|---|---|
| 135 | 635 |
| 150 | 1,440 |

(N. B. These data refer to operation in a continuous unit. The temperature recorded is that of the hottest portion of the catalyst bed.)

The use of the catalysts of enhanced activity obtained by silica promotion, permits effective operation of synthesis units at lower temperature, and hence the formation of 1,2-diaminocyclohexane may be minimized.

Various co-promoters for silica have been explored. It is found that iron in quantities up to 2% has a beneficial effect on the physical strength of the catalyst without any significant effect on catalyst activity. Nickel in quantities up to 10% provides a further reduction in 1,2-diaminocyclohexane formation. The nickel provides an increase in catalyst activity, but the reduction in by-product formation obtained in this case is also a directivity effect and not merely the result of permitting lower operating temperatures.

While the invention disclosed herein has been directed to improving the sintered cobalt oxide catalyst composition used in the liquid phase hydrogenation of adiponitrile to hexamethylenediamine, it is noteworthy that the improvements in catalyst activity which have been obtained provide similar benefits in certain other reactions where sintered cobalt catalysts are employed (e. g., the deoxidation of ethylene and the reduction of nitrile groups in general).

It should also be noted that somewhat similar effects are realized by corresponding modifications to fused cobalt oxide catalysts.

We claim:

1. In the hydrogenation of adiponitrile in the liquid phase to hexamethylenediamine at temperatures within the range of 50° to 170° C. under superatmospheric pressure in the presence of a reduced cobalt oxide catalyst, the method which comprises increasing the activity of the catalyst by maintaining the content of a promoter of the class consisting of silica and titania at a controlled level within the range 0.10 to 0.50% by weight, by introducing a colloidal substance of the class consisting of colloidal silica and colloidal titania into purified aqueous cobalt nitrate solution prior to precipitating the cobalt therefrom as carbonate, thereafter washing the said carbonate with water, drying the carbonate, converting the dried carbonate to oxide at 150° C. to 500° C., pelleting the said oxide in the presence of a vegetable stearin pilling lubricant, sintering the said oxide by heating at 600° to 1200° C., cooling the sintered catalyst thus obtained, and reducing the sintered catalyst by reaction with hydrogen, whereby a catalyst of increased activity in the hydrogenation of adiponitrile to hexamethylenediamine, is obtained, and thereafter hydrogenating adiponitrile to hexamethylene diamine in the presence of the said catalyst under super-atmospheric pressure at a temperature of 50° to 170° C. in the presence of the reduced catalyst thus obtained.

2. Process of claim 1 wherein the colloidal substance is colloidal titania.

3. Process of claim 1 wherein the colloidal substance is colloidal silica.

4. A silica-modified sintered cobalt oxide catalyst composition obtained in accord with the process of claim 1.

5. A titania-modified sintered cobalt oxide catalyst composition obtained in accord with the process of claim 1.

References Cited in the file of this patent

UNITED STATES PATENTS

| 1,266,782 | Ellis | May 21, 1918 |
| 2,166,150 | Howk | July 18, 1939 |
| 2,166,151 | Howk | July 18, 1939 |
| 2,166,152 | Howk | July 18, 1939 |
| 2,417,164 | Huber | Mar. 11, 1947 |
| 2,447,505 | Johnson | Aug. 24, 1948 |